Sept. 10, 1946. P. SARTORI 2,407,617
CURD MIXING AND KNEADING MACHINE
Filed Feb. 23, 1944 4 Sheets-Sheet 1

Paul Sartori
By Clarence A. O'Brien
and Harvey B. Jacobson
Attorneys

Sept. 10, 1946.  P. SARTORI  2,407,617
CURD MIXING AND KNEADING MACHINE
Filed Feb. 23, 1944  4 Sheets-Sheet 2
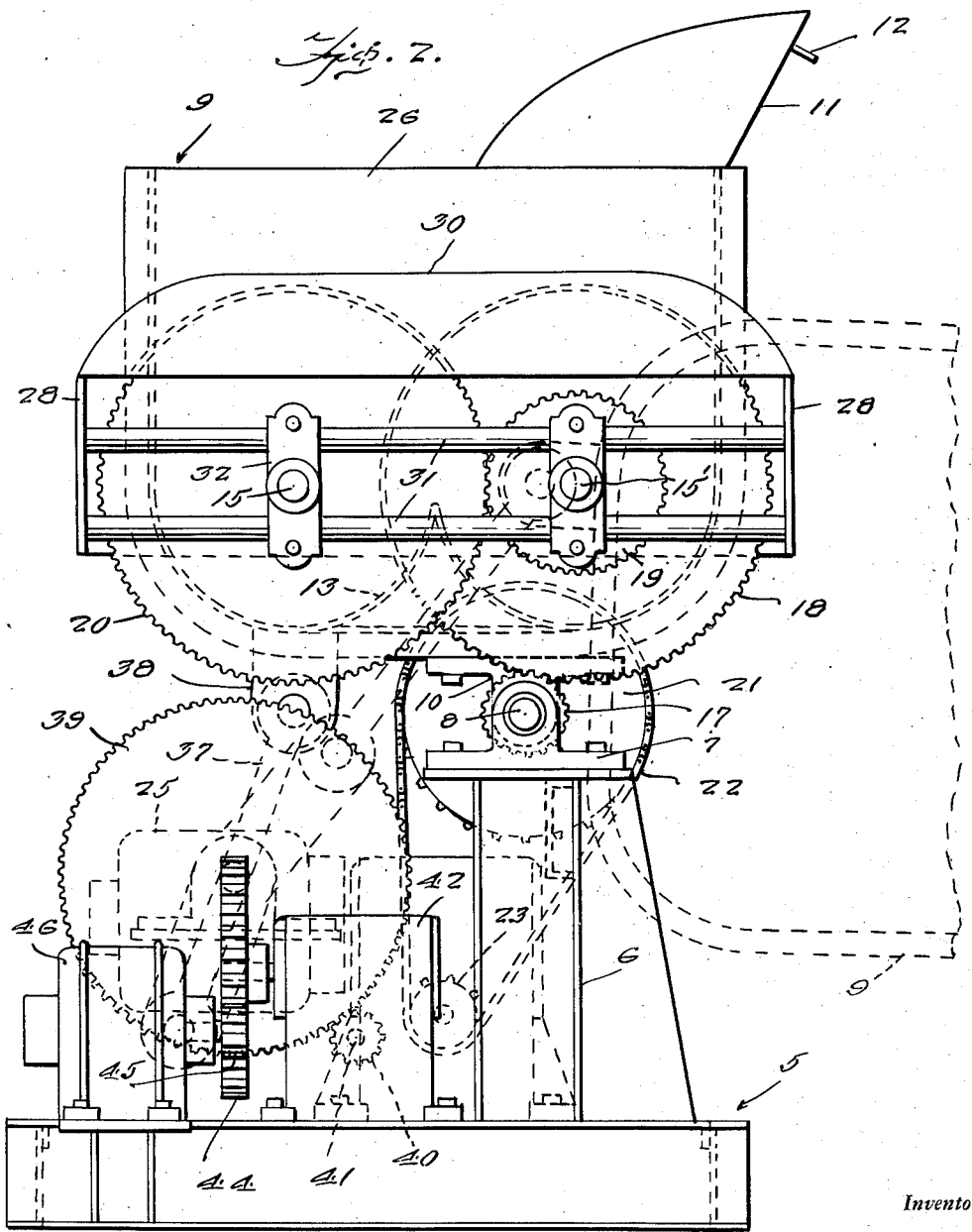
Inventor
Paul Sartori
By Clarence A. O'Brien
and Harvey B. Jacobson
Attorneys Sept. 10, 1946.  P. SARTORI  2,407,617
CURD MIXING AND KNEADING MACHINE
Filed Feb. 23, 1944  4 Sheets-Sheet 3
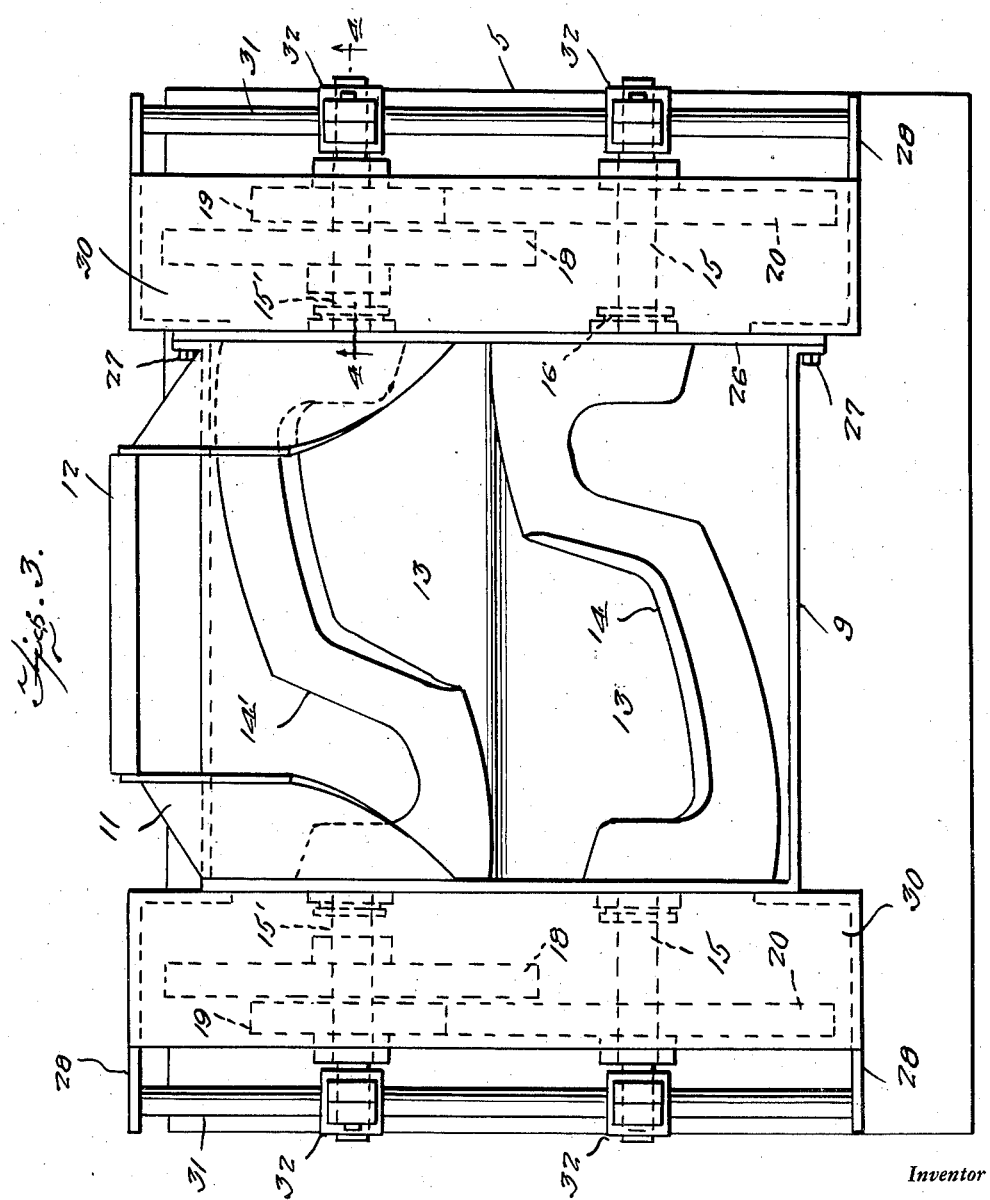
Inventor
Paul Sartori
By Clarence A. O'Brien
and Harvey B. Jacobson
Attorneys

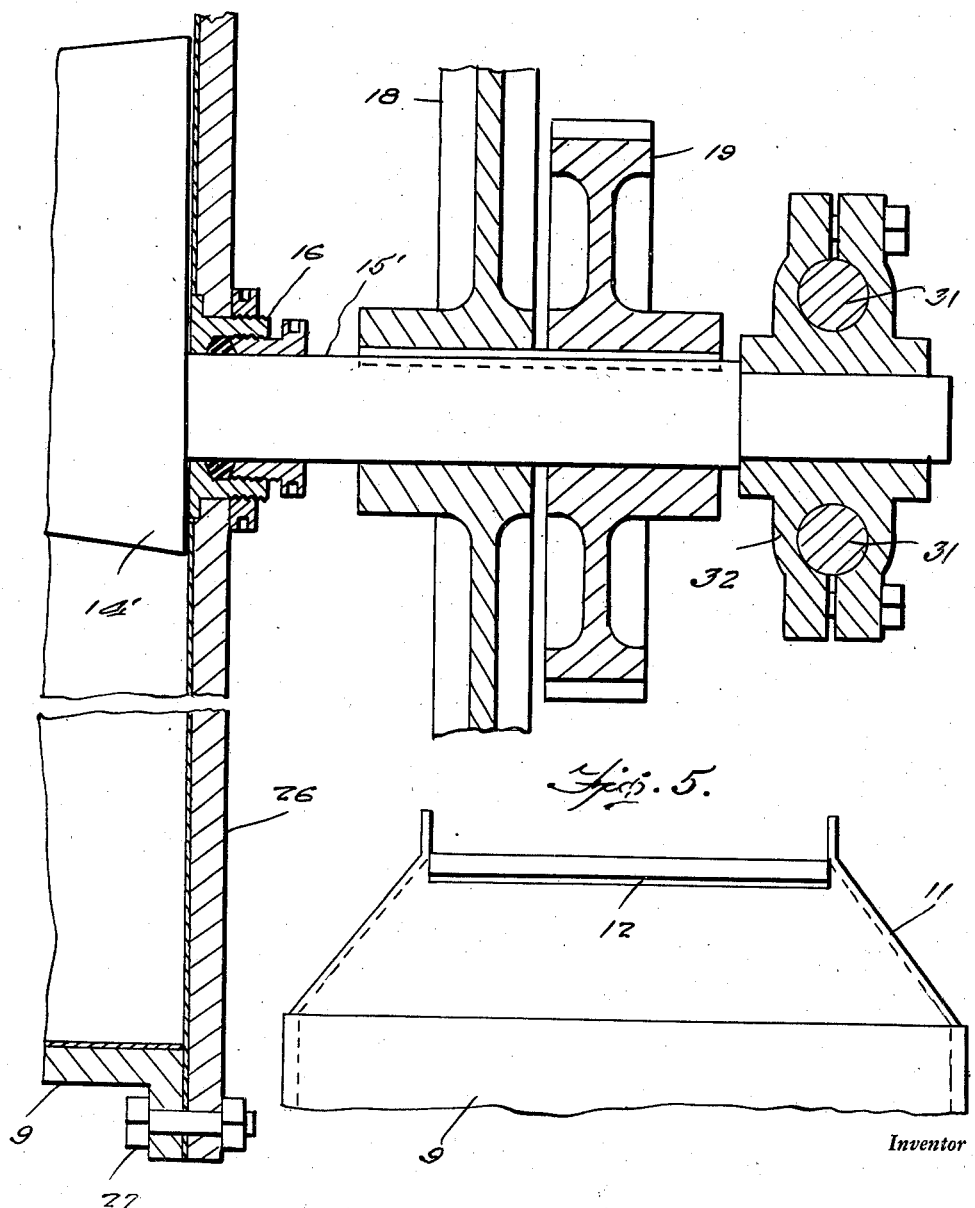

Patented Sept. 10, 1946

2,407,617

UNITED STATES PATENT OFFICE 2,407,617

CURD MIXING AND KNEADING MACHINE

Paul Sartori, Plymouth, Wis.

Application February 23, 1944, Serial No. 523,604

2 Claims. (Cl. 259—104)

This invention relates to a new and useful machine particularly designed for mixing and kneading curd, and an important object of the present invention is to provide a machine of the above kind by means of which the curd is subjected to a stretching or pulling and kneading operation rather than a cutting operation.

Another object of the present invention is to provide a machine of the above kind which is comparatively simple in construction, highly efficient in operation, durable, and otherwise well adapted to meet the requirements for a successful commercial use.

A more specific object of the invention is to provide a machine of the above kind including an open top mixing tub having rotary mixing paddles or stirrers therein, and motor-operated means for tilting the tub for dumping the contents thereof, the organization being such as to not disturb the driving connections with the paddles when the tub is tilted to dumping position.

The invention further contemplates a novel and improved manner of tiltably mounting the tub, novel means for driving the mixing paddles, and novel means for supporting and driving the paddle shafts.

More specific objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 2 is a side elevational view thereof.

Figure 3 is a top plan view of the same.

Figure 4 is an enlarged fragmentary vertical transverse section taken substantially upon the plane of line 4—4 of Figure 3.

Figure 5 is a fragmentary front elevational view showing the upper portion of the mixing tub and more clearly disclosing the form of its discharge spout.

Figure 1:
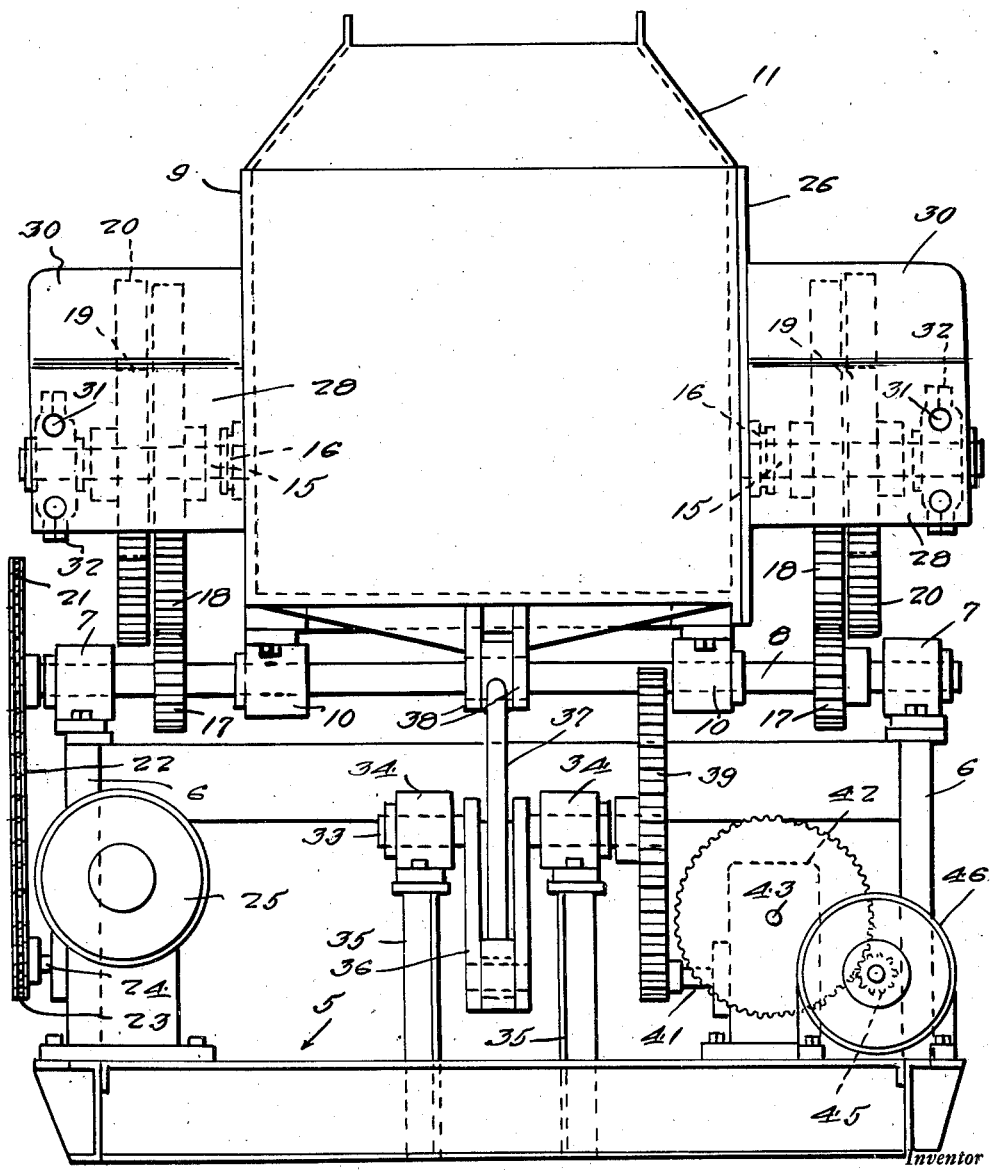
Figure 1 is a rear elevational view of a curd-mixing and kneading machine constructed in accordance with the present invention.

Referring in detail to the drawings, the present machine includes a suitable horizontal base 5 having suitably braced and rigidly connected uprights 6 rigidly mounted at opposite sides of the forward portion thereof. Secured on these uprights are bearings 7 in which are journaled the ends of a transverse horizontal drive shaft 8. The machine further includes an open top mixing and kneading tub 9 having bearings 10 fixed on the bottom thereof at opposite sides of the forward portion of the same. The bearings 10 have the drive shaft 8 rotatably extended therethrough so that the tub 9 is pivotally mounted on said shaft 8 for tilting movement so as to assume a normal position, as shown by full lines in Figure 2, or a forwardly tilted dumping position, as indicated by dotted lines in the same view. Tub 9 has a top discharge spout 11 at the forward portion thereof, which spout preferably tapers smaller in an upward direction and is provided at the top of its front wall with a projecting lip 12 below the upper edges of the side walls of the spout. The bottom of tub 9 is formed to provide adjacent transverse concave portions, as indicated at 13 in Figure 2, and in which horizontal rotary paddles or stirrers respectively operate. The paddles or stirrers 14 and 14' are of substantially S shape and have projecting shafts 15 and 15' rigid with the opposite ends thereof. These shafts project outwardly through stuffing boxes provided in the side walls of the tub 9, which stuffing boxes are of conventional form and generally indicated with respect to one of the same at 16 in Figure 4. Secured on drive shaft 8 at opposite sides of the tub 9 are pinions 17 meshing with large gears 18 fixed on the shafts 15' of the forward paddle or stirrer 14'. Another smaller gear 19 is secured on each shaft 15' and meshes with a larger gear 20 fixed on the adjacent shaft 15 of paddle or stirrer 14. In this way the paddles or stirrers are driven at different rates of speed, the paddle 14' rotating at twice the speed of the paddle 14 so as to obtain the desired pulling or stretching and kneading operation upon the curd placed in the tub 9. The shaft 8 projects at one side of the machine and has a sprocket wheel 21 fixed on the projecting end thereof. A sprocket chain 22 passes around sprocket wheel 21 and also around another sprocket wheel 23 on the driven shaft 24 of a motor-gearing unit 25 mounted upon the base 5 at this side of the machine. Thus, simple and efficient means is provided for the driving of shaft 8 so that power may be transmitted therefrom to the stirrers through the gearing 17, 18, 19 and 20, previously described. It will be noted that the tub 9 may freely tilt about shaft 8 to dumping position or back to upright operative position without disturbing the driving connection between gears 17 and 18, so that the stirrers may be driven and used to assist discharge of the curd from the tub when the latter is in dumping position. The electric motor of the unit 25 may have a suitable controlling switch located at a suitable point for throwing the stirrers or paddles into and out of operation.

The stuffing boxes 16 are for the obvious purpose of preventing leakage of the curd from the tub 9 about shafts 15 and 15', and as more clearly shown in Figures 3 and 4, a side wall 26 of the tub 9 is preferably removably bolted in place, as at 27. By removing the wall 26, removal of the stirrers or paddles is permitted for cleaning or repair.

Fixed to the side walls of tub 9 forwardly of gears 18 and rearwardly of gears 20 are angular guard plates 28 which project outwardly past the gears and act as protecting guards therefor. These guard plates support fenders 30 which are also attached to the sides of the tub and which overlie the gears 18 to 20, inclusive, so as to shield the latter from above. Rigidly connecting the guard plates 28 at each side of the tub and outwardly of the gears 18 to 20, inclusive, are spaced superposed parallel supporting rods 31 spanned by and carrying bearings 32 for the outer ends of shafts 15 and 15'.

Power-operated means is provided for rocking the tub 9 about the shaft 8 so as to swing the same to tilted position or back to upright operative position. For this purpose, a transverse horizontal crank shaft 33 is journaled in bearings 34 provided at the upper ends of spaced uprights 35 rigid with and rising from the base 5 near the rear of the latter, said shaft 32 having a crank 36 between the uprights 35, and said crank being operatively connected to the bottom of the tub 9 near the rear of the latter by means of a connecting rod 37 pivoted between ears 38 fixed to and depending from the tub. A large gear 39 is fixed on one end of crank shaft 33 and meshing with gear 39 is a pinion 40 fixed on the driven shaft 41 of a gearing unit 42 whose driving shaft 43 carries a large gear 44 meshing with a pinion 45 on the armature shaft of a motor 46 mounted on the base 5 at the side opposite that at which the unit 25 is located. In this way, motor 46 is utilized to drive crank shaft 33 for tilting tub 9 and returning it to normal upright position. If desired, a suitable switch may be employed for controlling the operation of motor 46 so as to stop the latter when the tub reaches fully tilted position, in addition to an ordinary manually operable switch for throwing the motor into and out of operation. However, should this automatic switch fail to function for some reason, no damage to the machine will result because the crank 36 and connecting rod 37 will simply act to return the tub 9 to upright position after it reaches fully tilted position, in case the motor 46 continued to operate. As automatic switching mechanisms are of a generally old type, and as any skilled electrician would know how to install one of the same on the present machine, no illustration thereof in this case is believed necessary.

In operation, the curd to be mixed and kneaded is placed in the tub 9 with the latter in the upright operative position of Figure 2, along with sufficient hot water, and motor-gearing unit 25 is thrown into operation so as to drive shaft 8 and thereby cause rotation of the paddles 14 and 14'. Upon completion of the mixing and kneading operation, motor 46 is thrown into operation so as to tilt the tub 9 to the dotted line dumping position of Figure 2, whereupon the mixed and kneaded curd is discharged into a suitable receptacle placed for its reception. When the tub reaches the dumping position, motor 46 is thrown out of operation, and after the discharge of curd from tub 9 is completed, said tub may be returned to operative upright position by again throwing the motor 46 into operation and then stopping it at the proper time.

It will be seen that the present machine is very compact and durable and consists of a very efficient arrangement and organization of parts. Of course, minor changes in details of construction illustrated and described may be resorted to, such as fall within the spirit and scope of the invention as claimed.

What I claim as new is:

1. A curd mixing and kneading machine comprising a supporting base, a transverse horizontal driving shaft mounted above the base, a tub pivotally mounted upon said driving shaft for movement to upright operative position or tilted dumping position, a motor mounted on the base operatively connected to said driving shaft for rotatably driving the same, rotary paddles mounted in the tub and operatively connected to said driving shaft so as to permit tilting of the tub without disturbing the driving connections between said driving shaft and said paddles, and power means including a motor mounted on the base for tilting said tub and returning the same to upright position, said paddles having intergeared operating shafts projecting through opposite sides of the tub, and said driving connections including pinions on the driving shaft and gears on the shafts of one of the paddles and meshing with said pinions, laterally projecting guard plates fixed to the opposite sides of the tub and disposed forwardly and rearwardly of the paddle shafts, supporting rods connecting said guard plates, and bearings spanning and supported by said rods and having the outer ends of the paddle shafts journaled therein.

2. A curd mixing and kneading machine comprising a supporting base, a transverse horizontal driving shaft mounted above the base, a tub having bearings fixed on the bottom thereof and pivotally mounted upon said driving shaft to mount the tub for vertical swinging movement to a rearwardly and upwardly swung upright operative position or a forwardly and downwardly tilted dumping position, a motor mounted on the base operatively connected to said driving shaft for rotatably driving the same, rotary paddles mounted in the tub and operatively connected to said driving shaft so as to permit tilting of the tub without disturbing the driving connections between said driving shaft and said paddles, and power means including a second motor mounted on the base for tilting said tub and returning the same to upright position, said last-named means including a crank shaft journaled above the base and operatively connected to said second motor and a connecting rod between the crank of said crank shaft and the bottom of the tub at the rear of the latter.

PAUL SARTORI.